United States Patent [19]

Kashihara et al.

[11] Patent Number: 4,955,256
[45] Date of Patent: Sep. 11, 1990

[54] TRANSMISSION CONTROL APPARATUS, HAVING MEANS FOR DETERMINING THE COMPLETION OF A SHIFTING ACTION OF A COUPLING DEVICE WITH PRESSURE ADJUSTING ACCUMULATOR

[75] Inventors: Yuji Kashihara; Kunihiro Iwatsuki, both of Toyota; Yutaka Taga, Aichi, all of Japan

[73] Assignee: Toyota Jidosha Kabushiki Kaisha, Toyota, Japan

[21] Appl. No.: 404,903

[22] Filed: Sep. 8, 1989

[30] Foreign Application Priority Data

Sep. 22, 1988 [JP] Japan ................... 63-238437

[51] Int. Cl.⁵ ............................................. B60K 41/06
[52] U.S. Cl. ....................................... 74/866; 74/867; 364/424.1
[58] Field of Search ................. 74/866, 878, 867, 868; 364/424.1

[56] References Cited

U.S. PATENT DOCUMENTS

| | | | |
|---|---|---|---|
| 4,667,541 | 5/1987 | Shimaoka et al. | 74/866 |
| 4,690,017 | 9/1987 | Taniguchi et al. | 74/866 |
| 4,722,247 | 2/1988 | Shindo et al. | 74/866 |
| 4,727,772 | 3/1988 | Sumiya et al. | 74/867 |
| 4,727,773 | 3/1988 | Sumiya et al. | 74/867 |
| 4,727,774 | 3/1988 | Sumiya et al. | 74/867 |
| 4,751,858 | 6/1988 | Iwatsuki | 74/867 |
| 4,771,386 | 9/1988 | Yasue et al. | 364/424.1 |
| 4,825,366 | 4/1989 | Yamamoto et al. | 364/424.1 |
| 4,838,125 | 6/1989 | Hamano et al. | 74/866 |
| 4,843,922 | 7/1989 | Kashihara | 74/867 X |
| 4,854,195 | 8/1989 | Muroto et al. | 74/867 |
| 4,858,499 | 8/1989 | Ito et al. | 74/866 |
| 4,882,952 | 11/1989 | Kashihara et al. | |

FOREIGN PATENT DOCUMENTS 61-149657 7/1986 Japan .

Primary Examiner—Dwight Diehl
Attorney, Agent, or Firm—Oblon, Spivak, McClelland, Maier & Neustadt

[57] ABSTRACT

A hydraulic control apparatus for controlling a hydraulically operated automatic transmission, having a speed sensor for detecting the speed of a rotary member which changes due to a shifting action of a frictionally coupling device. The apparatus includes a device for determining, based on the detected speed of the rotary member, that the shifting action of the coupling device is completed, and a device which is operated in the event of a failure of the speed sensor, for determining that the shifting action of the coupling device is completed when a time which has passed after the moment at which the need to effect the shifting action was determined or at which a shifting command to initiate the shifting action was generated exceeds a predetermined time interval. Upon determination of the completion of the shifting action, an electronic device terminates an operation to control the back pressure of an accumulator for adjusting the fluid pressure applied to the coupling device.

6 Claims, 9 Drawing Sheets

| SHIFT LEVER POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | ○ | | | | ◎ | | ◎ |
| D | 3 | ○ | ○ | ○ | | ○ | | | | | ◎ |
| D | 4 | ○ | ○ | | | ○ | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | | ○ | | | | | ◎ |
| L | 1 | ○ | | ○ | | | ○ | | | ◎ | ◎ |
| L | 2 | ○ | | | ○ | ○ | ○ | | ◎ | | ◎ |

◎ : ACTIVATED ONLY WHILE ENGINE TORQUE IS TRANSMITTED IN FORWARD DIRECTION

FIG.2

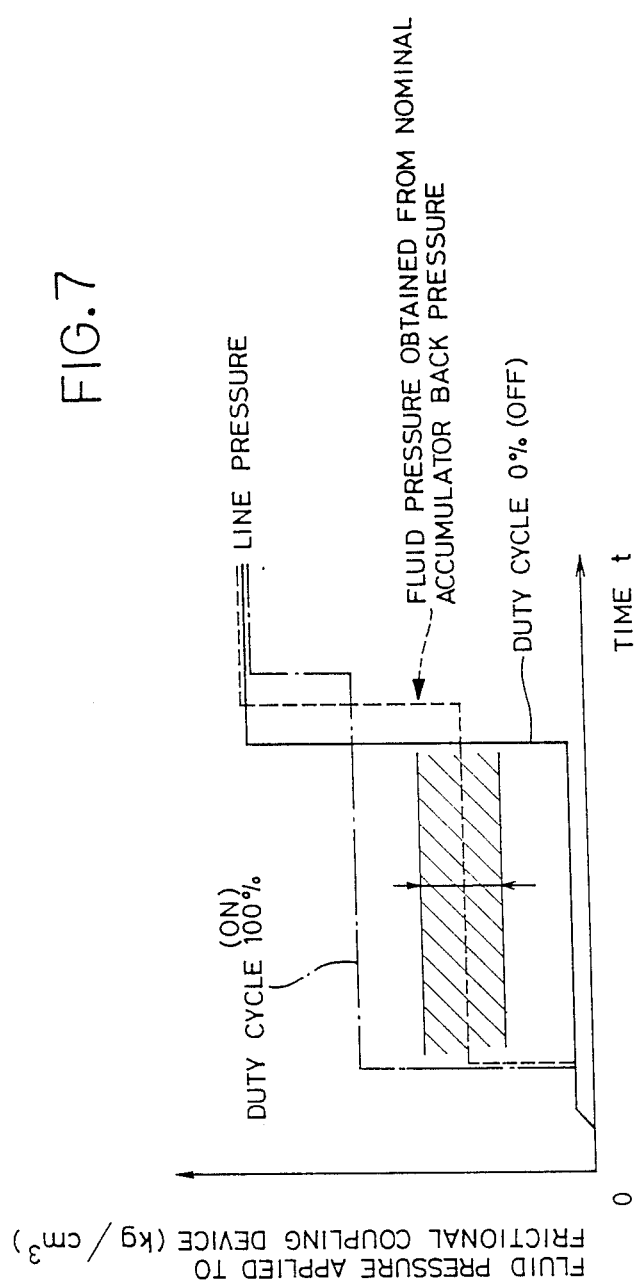

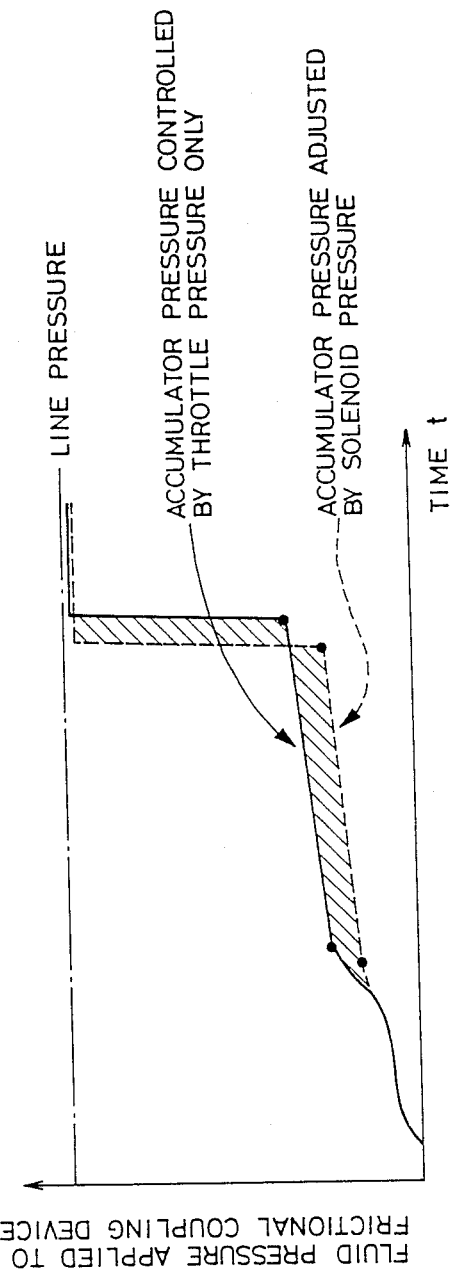

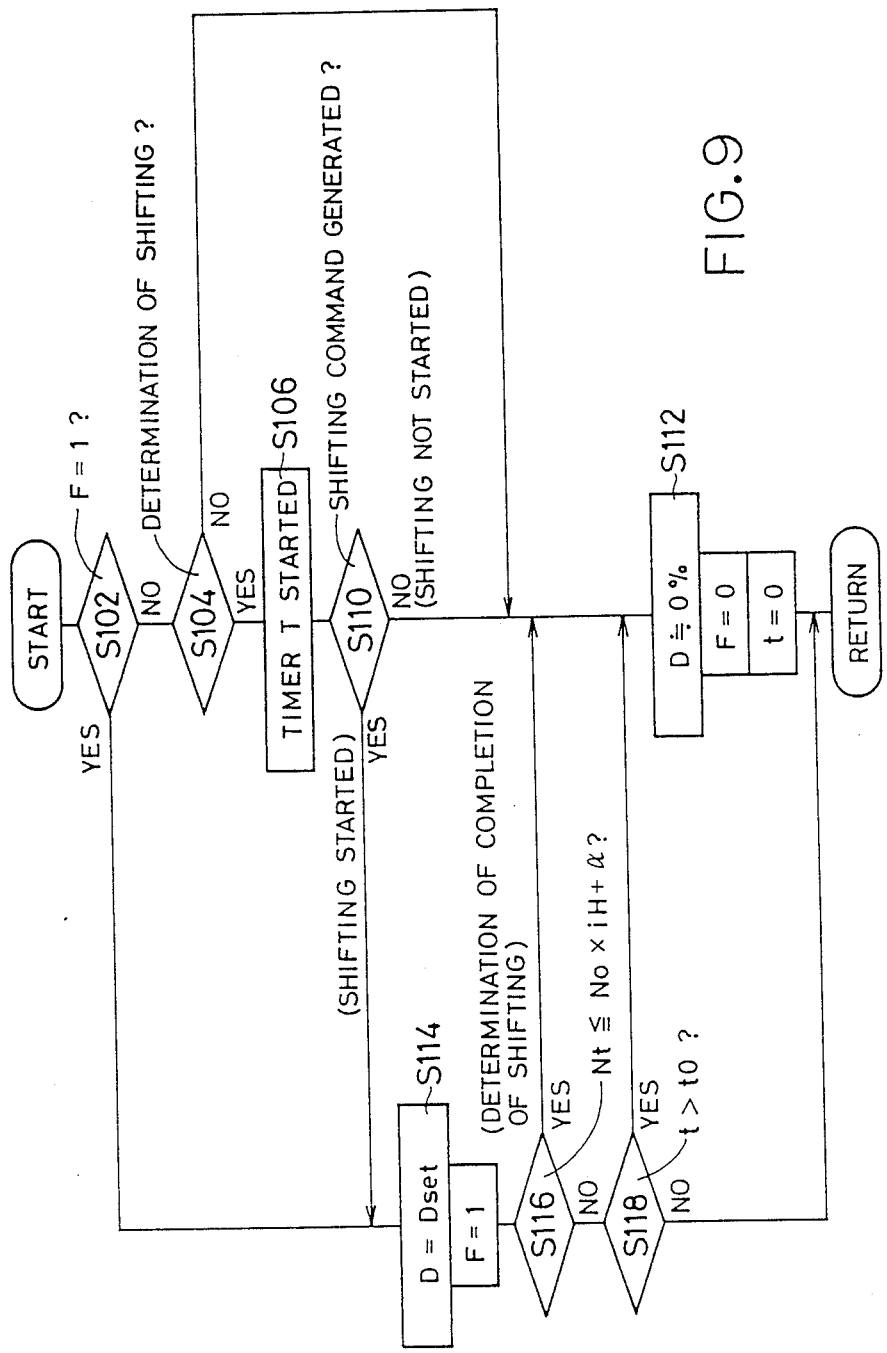

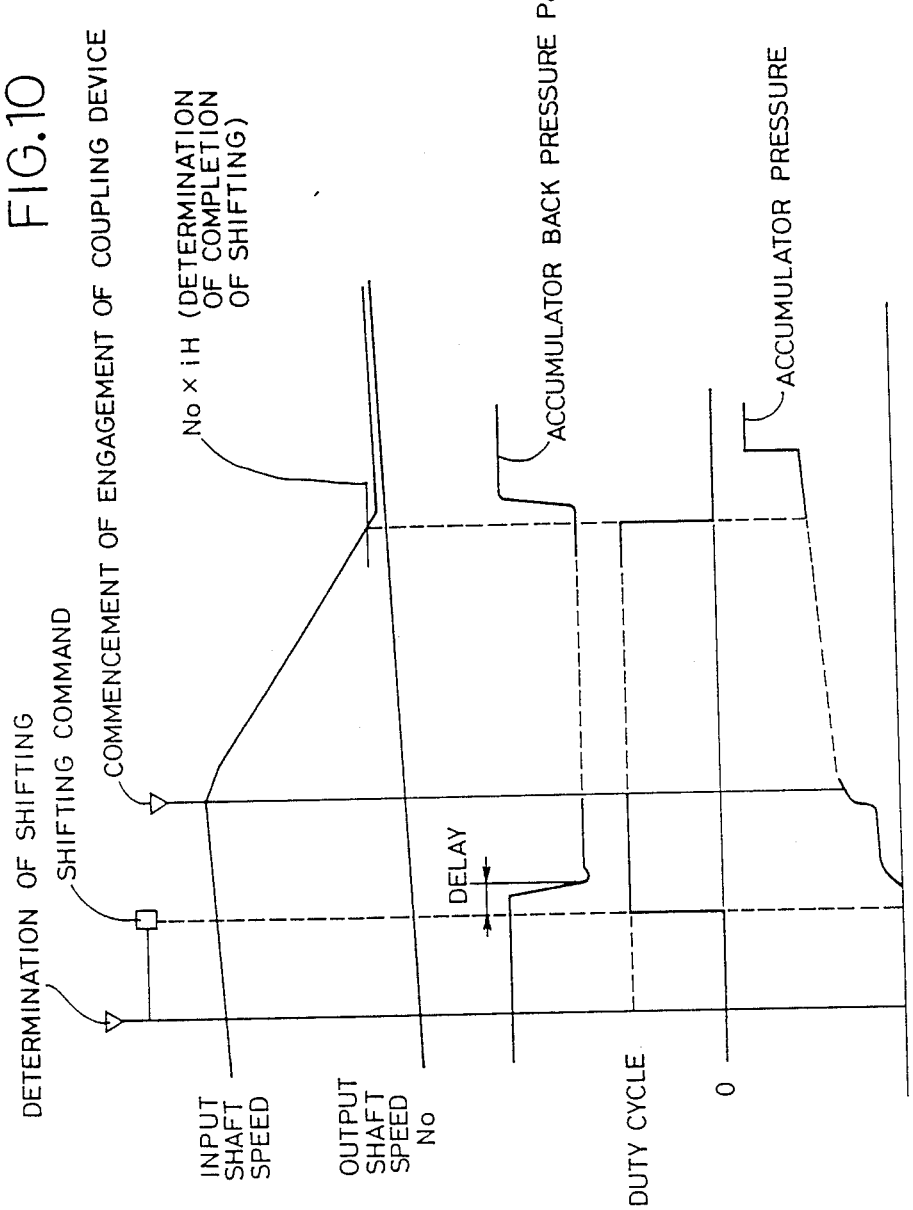

TRANSMISSION CONTROL APPARATUS, HAVING MEANS FOR DETERMINING THE COMPLETION OF A SHIFTING ACTION OF A COUPLING DEVICE WITH PRESSURE ADJUSTING ACCUMULATOR

BACKGROUND OF THE INVENTION

1. Field of the Invention

The present invention relates in general to a hydraulic control apparatus for controlling a hydraulically operated automatic transmission of a motor vehicle, and more particularly to a device for determining the completion of a shifting operation of a coupling device of the transmission, in order to electronically control the back pressure of an accumulator for minimizing a shifting shock of the transmission.

2. Discussion of the Prior Art

In the art of controlling an automatic transmission of a motor vehicle, there is known a hydraulic control apparatus which uses a cylinder-piston type accumulator connected in a fluid path leading to a hydraulically operated frictionally coupling device, so that the increase and decrease of the fluid pressure applied to the coupling device are suitably controlled when the fluid is fed and discharged to and from the coupling device. An example of such a hydraulic control apparatus is disclosed in laid-open Publication No. 61-149657 of unexamined Japanese Patent Application.

In the hydraulic control apparatus disclosed in the above-identified publication, a frictional coupling device B-2 shown in FIG. 4, for example, is supplied with a line pressure delivered from a shift valve (not shown). The line pressure is also applied to an accumulator 500 which communicates with the coupling device B-2. When the coupling device B-2 is commanded to perform a shifting or engaging action, a piston 501 of the accumulator 500 is moved upward as the line pressure is applied to the accumulator 500 and the coupling device B-2. As a result, the piston 501 is positioned so that the fluid pressure applied to the coupling device B-2 corresponds to a sum of a biasing force of a spring acting on the piston 501 in the downward direction, and a force based on a pressure in a back pressure chamber 502 of the accumulator 500, which force also acts on the piston 501 in the downward direction. The back pressure in the chamber 502 is controlled by an accumulator control valve 300.

Therefore, the fluid pressure applied to the frictionally coupling device B-2 can be regulated by controlling the pressure applied to the back pressure chamber 502 of the accumulator 500. The amount of a torque transmitted by the coupling device B-2 changes with the fluid pressure applied to the coupling device, and consequently the transmission torque of the coupling device can be regulated by controlling the back pressure of the accumulator 500. In other words, the shifting or engaging action of the coupling device B-2 can be effected with a reduced shifting shock, by suitably controlling the accumulator back pressure.

The optimum amount of transmission torque of a frictionally coupling device for assuring a smooth engaging action of the coupling device varies with the output of an engine to which the transmission is connected. In view of this fact, the accumulator is adapted to receive at its back pressure chamber a pressure which varies with the amount of opening of a throttle valve, which in turn reflects the currently required output of the engine.

Recently, the use of a solenoid-operated control valve whose duty cycle is electronically controlled is proposed to make fine adjustment of the accumulator back pressure for regulating the fluid pressure applied to a frictional coupling device, depending upon various running conditions of the vehicle, which includes the amount of opening of the throttle valve. An example of such a solenoid-operated valve is shown at 300 in FIG. 4 of the above-identified laid-open Publication 61-149657.

In the hydraulic control apparatus using an electronic control device for regulating the accumulator back pressure for a frictionally coupling device of an automatic transmission as described above, the regulation of the accumulator back pressure is unnecessary while the transmission is not in the process of a shifting operation. In other words, it is necessary to terminate the back pressure regulation of the accumulator by deenergizing the solenoid-operated control valve, when the shifting action of the coupling device is terminated or completed. To this end, it is proposed to use a timer for estimating the moment at which the shifting action is completed. This arrangement assures relatively improved life expectancy of the solenoid-operated valve.

In the above arrangement using the timer for estimating the completion of the shifting action, the time to be measured by the timer should be set considerably longer than a time during which the shifting action is normally expected to be terminated. Namely, it is required to prevent the solenoid-operated valve from being deenergized to terminate the regulation of the accumulator back pressure before the shifting action is terminated or while the coupling device is still in the shifting action.

To minimize the shifting shock of the transmission, it is desired that the accumulator back pressure regulated by the solenoid-operated valve or the fluid pressure which is applied to the coupling device and controlled by the back pressure be kept at a level which is as low as possible to permit engagement of the coupling device. If the fluid pressure is kept at such a low level for a long period of time due to the above-indicated setting of the timer, the coupling device is likely to undergo undesirable slipping. In this respect, it is desirable to raise the fluid pressure applied to the coupling device to a safe level, as soon as the shifting action has been terminated.

On the other hand, it is known to determine the commencement or termination of a shifting action of a coupling device, based on a change in the detected rotating speed of a rotary member of the transmission. Upon determination of the shifting action, the regulation of the accumulator back pressure is terminated, and the fluid pressure applied to the coupling device is raised to an optimum to hold the coupling device in the engaged position.

However, the above-indicated arrangement may fail to determine or detect the completion of the shifting action of the coupling device, due to some failure, such as a defective speed sensor for detecting the speed of the rotary member, or electrical discontinuity or short-circuiting between the speed sensor and an electronic controller or computer. In this case, the solenoid-operated control valve for the accumulator back pressure is kept energized for a long time, and the fluid pressure of the coupling device is held at a controlled relatively low level determined by various parameters such as the throttle valve opening as indicated above. Consequently, the coupling device may slip, and the control valve may be deteriorated or its life expectancy is reduced.

SUMMARY OF THE INVENTION

It is therefore an object of the present invention to provide an improved hydraulic control apparatus for controlling an automatic transmission of a motor vehicle, which permits reliable determination as to whether a shifting action of a frictionally coupling device is completed, and which assures adequate regulation of the fluid pressure applied to the coupling device, and improved durability or life expectancy of the transmission.

The above object may be achieved according to the principle of the present invention, which provides a hydraulic control apparatus for controlling a hydraulically operated automatic transmission of a motor vehicle having a frictionally coupling device, an accumulator which communicates with the frictionally coupling device, and a rotary member whose rotating speed changes due to a shifting action of the coupling device, the apparatus including an electronic control device for controlling a back pressure of the accumulator during a shifting action of the coupling device for minimizing a shifting shock of the transmission, the apparatus comprising: (a) first determining means for effecting a first determination that the transmission should be shifted with the shifting action of the frictionally coupling device; (b) means for generating a shifting command to initiate the shifting action after the first determination; (c) speed detecting means for detecting a rotating speed of the rotary member; (d) second determining means for effecting a second determination, based on the rotating speed detected by the speed detecting means, that the shifting action of the frictionally coupling device is completed; (e) time measuring means for measuring a time which has passed after one of a moment when the first determination is effected and a moment of generation of the shifting command; and (f) third determining means for effecting a third determination that the shifting action is completed, irrespective of the detected rotating speed of the rotary member, when the time measured by the time measuring means exceeds a predetermined time interval.

The rotary member whose speed is detected by the speed detecting means may be a turbine impeller shaft of a torque converter, an input shaft of an overdrive mechanism, a frictionally coupling device (which may be the coupling device recited above) connected to the input shaft, or a crankshaft of an engine to which the transmission is operatively connected.

In the hydraulic control apparatus of the present invention constructed as described above, the determination of the completion of a shifting or engaging action of the frictionally coupling device is principally effected by the second determining means, namely, based on the rotating speed of the rotary member which changes as the shifting action proceeds. This manner of determination of the termination of the shifting action is not affected by a variation in the actual shifting or engaging time of the coupling device, which variation arises from a change in the operating temperature of the working fluid of the transmission or chronological change of the operating characteristic of the coupling device. This arrangement therefore prevents the termination of the back pressure regulation of the accumulator before the shifting action of the coupling device is completed. After the back pressure regulation of the accumulator is terminated upon determination of the completion of the shifting action, the back pressure of the accumulator is raised to an optimum level at which the engaged coupling device will not easily slip even under fluctuating operating conditions.

Further, the present control apparatus is provided with the time measuring means for measuring the time which has passed from the moment at which the need to effect the shifting action was determined, or from the moment at which the shifting command to initiate the shifting action was generated. The measured time is compared with a predetermined time interval, by the third determining means, for determining the completion of the shifting action, when the measured time exceeds the predetermined time interval. Since the time interval is determined such that the shifting action is normally terminated during that time interval, the speed detecting means and/or second determining means is-/are considered to fail, i.e., normally function to effect the determination based on the detected speed of the rotary member, if the measured time exceeds the predetermined time interval. Therefore, the determination of the completion or termination of the shifting action of the coupling device is accomplished even in the event of failure of the speed detecting means, for example. Thus, the regulation of the back pressure of the accumulator for controlling the fluid pressure applied to the coupling device may be terminated at a suitable point of time when or after the shifting action is actually completed. This arrangement prevents continuing energization and consequent deterioration of a solenoid-operated control valve for the regulation of the accumulator back pressure, in the event of failure to effect the determination of the completion of the shifting action based on the detected speed of the rotary member.

If the shifting operation of the coupling device takes place while the fluid pressure applied to the frictionally coupling device is at an extraordinarily low level for some reason or other, the determination of the completion of the shifting action may not be made based on the detected speed of the rotary member, even after the piston of the accumulator has reached its stroke end. In this case, the fluid pressure applied to the frictionally coupling device is suddenly raised up to the line pressure when the accumulator piston has reached the stroke end. This causes a considerably large shifting shock of the coupling device. According to the present control apparatus, however, the third determining means determines that the shifting operation is completed, at the time when the measured time exceeds the predetermined time interval. At this time, the regulation of the back pressure of the accumulator is terminated, and the back pressure is positively or forcibly increased, to accelerate the shifting action of the coupling device. Therefore, even if the accumulator piston has reached the stroke end before the shifting operation has not been terminated, the shifting shock in this case is reduced as compared with the case where the relatively low fluid pressure of the coupling device is suddenly raised to the line pressure. That is, the shifting shock in the latter case is divided into two fractions in the present hydraulic control apparatus, one occurring at the time when the accumulator back pressure (operating pressure of the coupling device) is positively increased upon the third determination by the third determining means of the completion of the shifting action, and the other occurring at the time when the accumulator piston has reached the stroke end.

While the electronic device is used to regulate the back pressure of the accumulator, it is not essential that the regulation of the accumulator back pressure is effected in an electronically feedback manner.

The automatic transmission may comprise an underdrive mechanism including a plurality of planetary gear units capable of selectively establishing a plurality of shift positions, and an overdrive mechanism which is disposed between the underdrive mechanism and an engine of the vehicle. The frictionally coupling device recited above is one of a plurality of frictionally coupling devices incorporated in the underdrive and overdrive mechanisms.

Where the rotary member whose speed is detected by the speed detecting means is an input shaft of the overdrive mechanism, the frictionally coupling device may be a hydraulically operated brake incorporated in the underdrive mechanism. In this case, the apparatus may further comprise pressure control means for controlling a fluid pressure applied to the brake by regulating the back pressure of the accumulator depending upon a change in the rotating speed of the input shaft of the overdrive mechanism. The apparatus may further comprise means for terminating the regulation of the back pressure of the accumulator in response to the determination by the third determining means that the shifting action of the coupling device is completed, when the measured time exceeds the predetermined time interval. The pressure control means may comprise calculating means for calculating a target speed of the input shaft of the overdrive mechanism, based on speeds of the input shaft upon commencement and termination of the shifting action of the brake. In this instance, the pressure control means is adapted to control the back pressure of the accumulator so that the rotating speed of the input shaft detected by the speed detecting means coincides with the calculated target speed.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which:

FIG. 2 is a view illustrating different operating conditions of frictionally coupling devices of the automatic transmission;

FIG. 7 is a graph showing a variation in the fluid pressure supplied to the frictionally coupling device, which occurs due to a variation in the operating characteristic of the solenoid valve;

FIG. 8 is a graph indicating a rise in the fluid pressure applied to the frictionally coupling device;

FIG. 9 is a flow chart illustrating an operation of the control apparatus; and

FIG. 10 is a graph showing changes in various parameters of the automatic transmission during a shifting operation.

DETAILED DESCRIPTION OF THE PREFERRED EMBODIMENT

Figure 1:
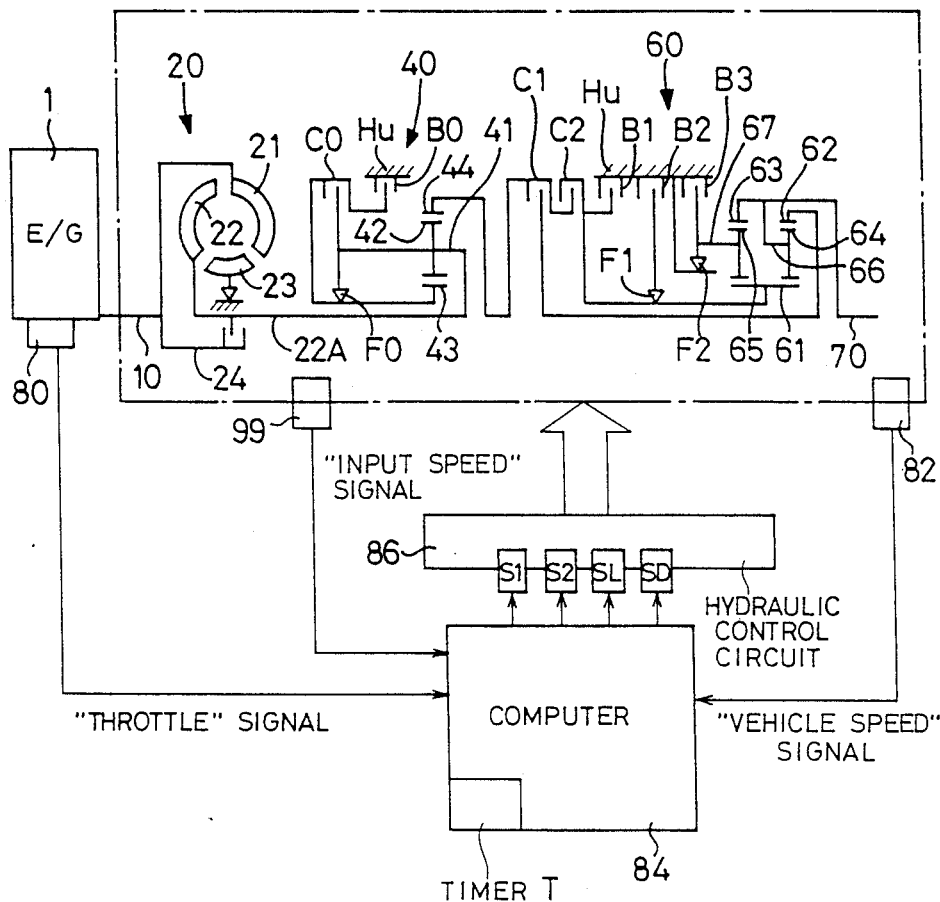
FIG. 1 is a schematic block diagram showing an example of an automatic transmission for a motor vehicle, and one embodiment of a hydraulic control apparatus of the invention for controlling the automatic transmission.

Referring to the schematic view of FIG. 1, there is shown a power transmitting system of a motor vehicle, which includes a hydraulic control apparatus constructed according to a presently preferred embodiment of this invention for controlling the automatic transmission of the system.

The automatic transmission indicated by a block of one-dot-chain line in FIG. 1 includes a torque converter 20 connected to a vehicle engine 1 through a crankshaft 10, an overdrive mechanism 40 connected in series to the torque converter 20, and an underdrive mechanism 60 connected in series to the overdrive mechanism 40. The underdrive mechanism 60 has one rear-drive position "R", and three forward-drive positions "1" (1st-speed position), "2" (2nd-speed position), and "3" (3rd-speed position). The three forward-drive positions "1", "2" and "3" are selectively established while a driver-controlled shift lever is placed in one of three positions "L", "2" and "D", with the overdrive mechanism 40 placed in its off position, as indicated in the table of FIG. 2. While the overdrive mechanism 40 is placed in its on position, a fourth forward-drive position "4" (4th-speed position) may be established as needed, when the driver-controlled shift lever is in the DRIVE position "D".

The torque converter 20 is a well known arrangement which has a pump impeller 21, a turbine impeller 22, a stator 23 and a lockup clutch 24. The turbine impeller 22 is connected to an input shaft 22A of the overdrive mechanism 40.

The overdrive mechanism 40 employs a single planetary gear unit consisting of a sun gear 43, a ring gear 44, a planetary pinion 42, and a carrier 41. This planetary gear unit is controlled by frictionally coupling devices which consist of a clutch C0, a brake B0, and a one-way clutch F0.

The underdrive mechanism 60 incorporates two planetary gear units which use a common sun gear 61. The first planetary gear unit includes the sun gear 61, a ring gear 62, a planetary pinion 64 and a carrier 66, while the second planetary gear unit includes the sun gear 61, a ring gear 63, a planetary pinion 65 and a carrier 67. The operating condition of these two planetary gear units, and the connection with the overdrive mechanism 40 are regulated by frictionally coupling devices which consist of clutches C1, C2, brakes B1-B3 and one-way clutches F1, F2.

With the clutches C1, C2 and brakes B1-B3 of the underdrive mechanism 60 controlled as indicated in FIG. 2, one of the forward-drive positions "1,", "2" and "3" is selected. With the clutch C0 and brake B0 of the overdrive mechanism 40 controlled as indicated in FIG. 2, the automatic transmission is shifted between the forward-drive positions "3" and "4".

Since the automatic transmission schematically illustrated in FIG. 1 and described above is well known in the art, no further description of the same is deemed necessary for understanding the principle of the present invention, which relates to the apparatus for controlling the transmission.

The hydraulic control apparatus for controlling the automatic transmission utilizes a hydraulic control circuit 86, and a hydraulic control device in the form of a computer 84. The computer 84 receives a THROTTLE signal from a throttle sensor 80, a VEHICLE SPEED signal from a vehicle speed sensor 82, and an INPUT SPEED signal from an input speed sensor 99. The THROTTLE signal represents an amount of opening $\theta$ of a throttle valve of the engine 1, which is considered to be a currently required output (torque) of the engine 1. The VEHICLE SPEED signal represents a rotating speed of an output shaft 70 of the automatic transmission, from which a running speed of the vehicle can be calculated. The INPUT SPEED signal represents a rotating speed Nt of the turbine impeller 22 (input shaft 22A of the overdrive mechanism 40), which indicates a shifting condition of the transmission. The detected speed Nt of the input shaft 22A is used for controlling in a feedback fashion the back pressure Pac of an accumulator for each frictionally coupling device, so that the detected speed Nt changes so as to coincides with a calculated target speed, as described below. Further, the variation in the detected speed Nt is used to determine the moment at which a shifting operation of the transmission is completed or terminated, that is, the moment at which the feedback pressure control indicated above is terminated.

The hydraulic control circuit 86 includes solenoid-operated valves S1 and S2 for operating the brakes and clutches of the automatic transmission according to transmission shift maps stored in the computer 84, based on the currently detected opening $\theta$ of the throttle valve and the vehicle running speed, so as to shift the automatic transmission, as indicated in the table of FIG. 2. The hydraulic control circuit 86 further includes a solenoid-operated valve SL for operating the lockup clutch 24, and a linear solenoid valve SD which will be described.

In the present hydraulic control apparatus including the above-indicated computer 84 and hydraulic control circuit 86, the back pressure Pac of the accumulator for controlling the hydraulic pressure supplied to each frictionally coupling device (C0–C2, B0–B3) is regulated depending upon a THROTTLE pressure Pth and a solenoid-controlled pressure Ps1 which will be described.

This feedback control of the hydraulic pressure is effected until a shifting or engaging action of each frictionally coupling device is completed or terminated. To this end, it is necessary to accurately determine or detect the point of time at which the shifting action of the frictionally coupling device is terminated.

The arrangement for regulating the fluid pressure applied to the brake B2 will be described by way of example, be reference to FIG. 3.

Figure 3:
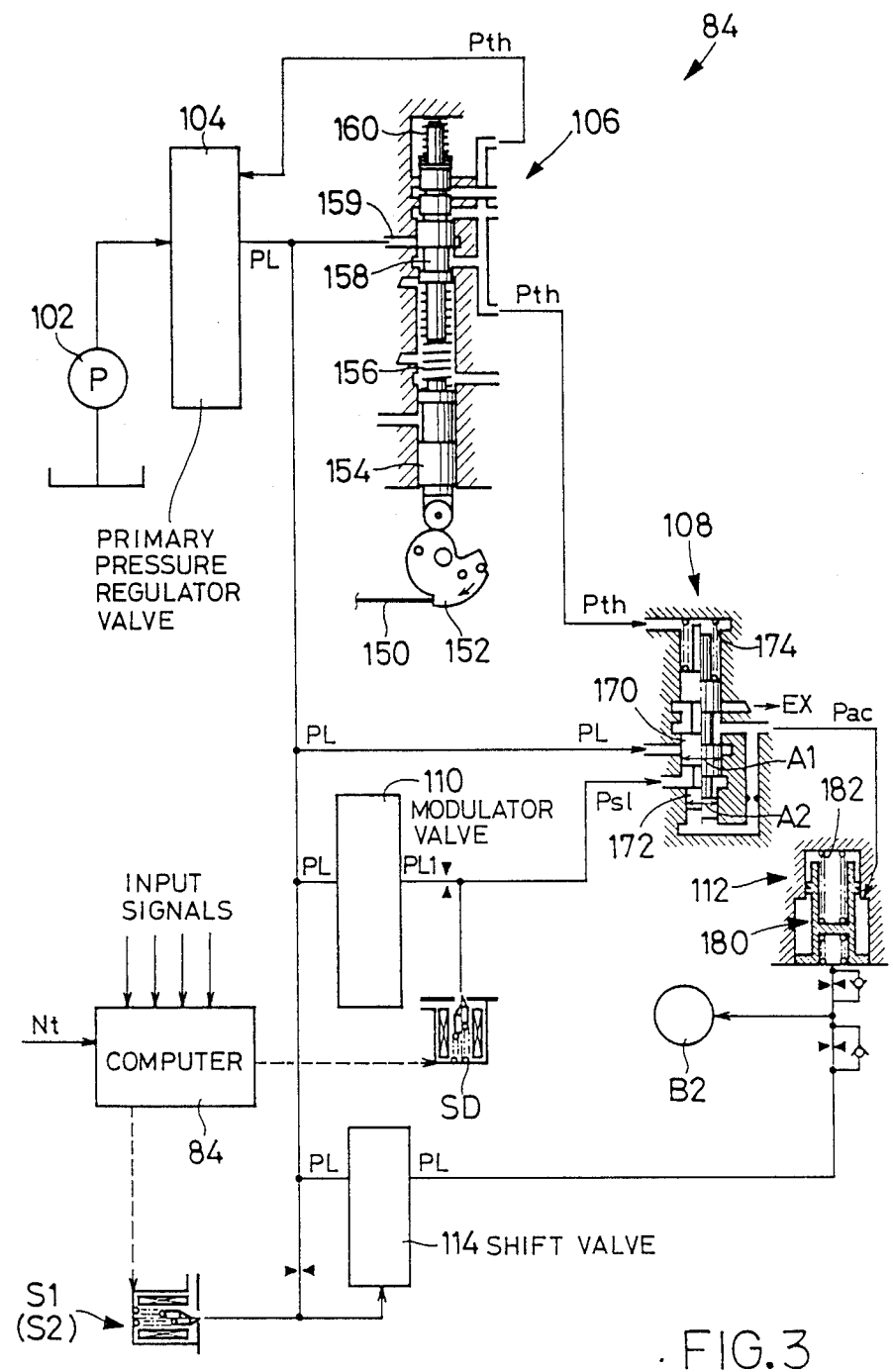
FIG. 3 is a fragmentary view of a hydraulic control circuit including an accumulator control value for controlling a fluid supply to one of the frictionally coupling devices through an accumulator.

In FIG. 3, reference numeral 102 denotes an oil pump, and reference numeral 104 denotes a primary pressure regulator valve connected to the pump 102. A line pressure PL delivered by the primary pressure regulator valve 104 is applied to a throttle sensing valve 106, an accumulator control valve 108, a modulator valve 110, and a shift valve 114 controlled by the solenoid-operated valve S1 (S2). The shift valve 114 is connected to the brake B2, and to the accumulator 112 for controlling the fluid pressure applied to the brake B2.

Figure 4:
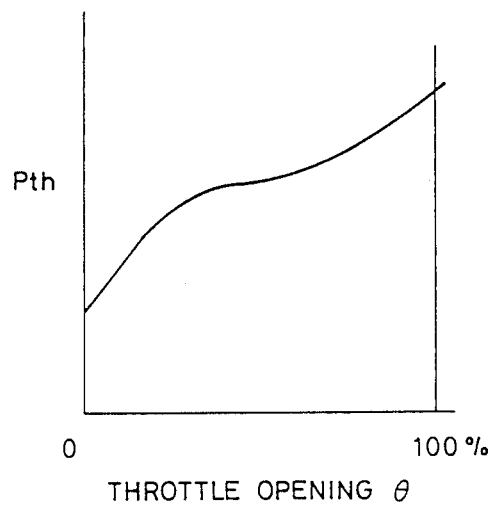
FIG. 4 is a graph indicating a relationship between the opening of the throttle valve and a throttle pressure applied to the accumulator control valve.

The fluid pressure produced by the pump 102 is adjusted by the primary pressure regulator valve 104 into the line pressure PL, in a manner as well known in the art. The throttle sensing valve 106 is provided to produce the above-indicated THROTTLE pressure Pth which reflects the amount of operation of the accelerator pedal of the vehicle, namely a currently required output of the engine. More specifically, the throttle sensing valve 106 is mechanically linked with a throttle valve of the engine 1, through a throttle cable 150 and a throttle cam 152. When the accelerator pedal is depressed, a plunger 154 of the valve 108 which engages the cam 152 is pushed upward as seen in FIG. 3, whereby a valve spool 158 of the valve 108 is moved upward through a spring 156. As a result, a line pressure port 159 of the valve 108 is accordingly opened, thereby producing the THROTTLE pressure Pth. This pressure Pth is applied to the accumulator control valve 108. The pressure Pth is also applied to a port so that the pressure Pth acts on the spool 158 in the downward direction, together with a biasing force of a spring 160 which acts on the upper end of the spool 158. According to this arrangement, the spool 158 is positioned such that the biasing force of the spring 156 acting on the spool 158 in the upward direction is balanced with a sum of the biasing force of the spring 160 and a force produced by the THROTTLE pressure, which act on the spool 158 in the downward direction. Consequently, the THROTTLE pressure Pth produced by the throttle sensing valve 106 is adjusted as a function of the amount of opening $\theta$ of the throttle valve, as shown in FIG. 4. As indicated in FIG. 3, the THROTTLE pressure Pth is fed back to the primary pressure regulator valve 104, so that the line pressure PL adjusted by the valve 104 reflects the currently required output of the engine 1.

As indicated above, the computer 84 receives the INPUT SPEED signal indicative of the rotating speed of the turbine impeller 22 of the torque converter 20, that is, the rotating speed Nt of the input shaft 22A of the overdrive mechanism 40. This speed Nt changes depending upon the shifting condition of the transmission 40, 60. The computer 84 compares the currently detected speed Nt with a calculated target speed Nt0, which is obtained based on the speed Nt prior to a shifting operation of the transmission, and a synchronizing speed (speed of the output shaft 70 $\times$ gear ratio of the transmission after the shifting operation) of the input shaft 22A after the shifting operation. For example, the speed Nt of the input shaft 22A is lowered when the transmission is shifted up. Therefore, if the detected speed Nt becomes lower than the calculated target speed NtO, this means that the shifting speed of the transmission is too high to assure a smooth shifting action of a frictionally coupling device of the transmission. To enable the brake B2 of the underdrive mechanism 60 to perform a smooth shifting or engaging action, for example, the computer 84 produces a signal for controlling the duty cycle of the solenoid valve SD of the hydraulic control circuit 86, so that a pressure PL1 adjusted by the modulator valve 110 based on the line pressure PL is regulated into the above-indicated solenoid-controlled pressure Ps1, by the solenoid valve SD.

This solenoid-controlled pressure Psl is applied to the accumulator control valve 108. The graph of FIG. 5 indicates the solenoid-controlled pressure Psl which varies with the controlled duty cycle of the solenoid valve SD.

The accumulator control valve 108 is adapted to adjust the line pressure PL into the back pressure Pac applied to the accumulator 112, depending upon the received THROTTLE pressure Pth and solenoid-controlled pressure Psl. The back pressure Pac is expressed by the following equation (1):

$$Pac = A1/A2 \cdot Pth + Fs/A2 - Psl(A/A2 - 1) \tag{1}$$

where,
- A1: Pressure-receiving area of a first land 170 of the spool 158
- A2: Pressure-receiving area of a second land 172 of the spool 158
- Fs: Biasing force of a spring 174 acting on the spool 158

Figure 6:
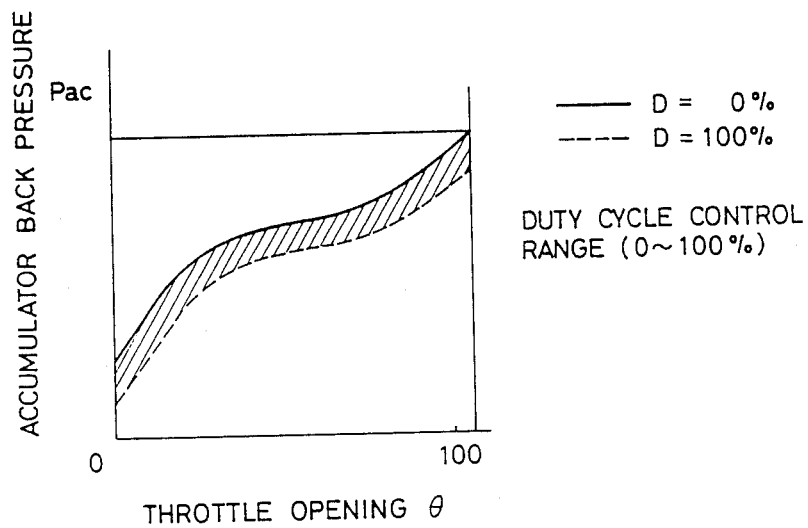
FIG. 6 is a graph showing a relationship between the throttle opening and the back pressure of the accumulator.

As seen from FIG. 3, the pressure-receiving area A1 is larger than the pressure-receiving area A2. It will be understood from the above equation (1) that the back pressure Pac applied to the accumulator 112 is principally determined by the THROTTLE pressure Pth and is adjustable by an amount equal to a product of the solenoid-controlled pressure Psl and the value (A1/A2−1). The relationship between the accumulator back pressure Pac and the throttle opening $\theta$ of the throttle valve is indicated in the graph of FIG. 6. The graph shows that the accumulator back pressure Pac increases with the throttle opening $\theta$, and is adjustable within a given range by changing the duty cycle of the solenoid valve SD, i.e., by controlling the solenoid-controlled pressure Psl. The graph also shows that even if the computer 84 fails to adequately control the duty cycle of the solenoid valve SD, the back pressure Pac of the accumulator 112 will not considerably fluctuate. In other words, the solenoid valve SD is provided to make a fine adjustment of the back pressure Pac, and a variation in the operating characteristic of the valve SD or an error in the manufacture of the valve SD will not have an appreciable adverse effect or influence on the back pressure Pac. Accordingly, the present apparatus assures adequate regulation of the back pressure Pac (and consequently, adequate regulation of the pressure applied to the brake B2), without requiring stringent quality control of the solenoid valve SD (without increasing the cost of manufacture of the valve SD).

Figure 5:
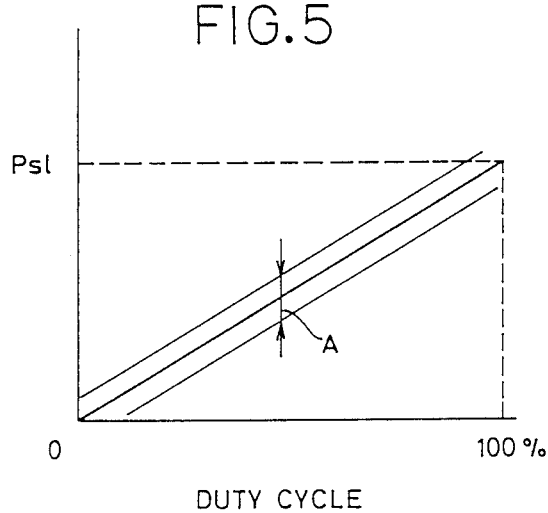
FIG. 5 is a graph showing a relationship between the duty cycle of a solenoid valve SD and a solenoid-controlled pressure Ps1 applied to the accumulator control valve.

Explained more specifically, an inherent variation in the operating characteristic of the solenoid valve SD results in a variation in the solenoid-controlled pressure Psl corresponding to the specific duty cycle (%) of the valve SD, as indicated at "A" in FIG. 5. Therefore, if the accumulator back pressure Pac is controlled solely by the solenoid-controlled pressure Psl, the back pressure Pac fluctuates from the nominal value, and the fluid pressure supplied to the frictionally coupling device (brake B2) accordingly fluctuates over a range indicated by hatched lines in the graph of FIG. 7. In the present hydraulic control apparatus, however, the back pressure Pac is principally determined by the THROTTLE pressure Pth, and the solenoid-controlled pressure Psl is used merely for adjusting the pressure Pac to a small extent depending upon the shifting condition of the transmission. Hence, the variation in the operating characteristic of the valve SD will give only a small effect to the pressure of the fluid supplied to the frictionally coupling device.

Referring back to FIG. 3, the shift valve 114 is operated by the solenoid valve S1 as well known in the art, when the computer 84 determines that the transmission should be shifted from one position to another, for example, when the computer 84 determines that the brake B2 should be brought to the engaged position to shift the transmission from the 1st-speed position "1" to the 2nd-speed position "2", as indicated in FIG. 2. As a result, the line pressure PL is fed from the shift valve 114 to the brake B2. At the same time, a piston 180 of the accumulator 112 begins to be moved upward against a biasing force of a spring 182 and the controlled back pressure Pac, both of which act on the piston 180 in the downward direction. As a result, the piston 180 is located at a position at which the force based on the fluid pressure acting on the piston 180 is balanced with the sum of the biasing force of the spring 182 and a force based on the back pressure Pac. Thus, the fluid pressure applied to the brake B2 during its engaging action may be suitably controlled by regulating the accumulator back pressure Pac, as described above and as indicated in the graph of FIG. 8.

In FIG. 8, solid lines indicate the fluid pressure which is controlled based on the THROTTLE pressure Pth only, while dashed lines indicate the fluid pressure which is principally controlled by the THROTTLE pressure Pth and is compensated or adjusted based on the solenoid-controlled pressure Psl. That is, the fluid pressure may be finely adjusted within a range indicated by hatched lines, depending upon the solenoid-controlled pressure Psl which reflects the shifting condition of the brake B2.

As described above, the back pressure Pac applied to the accumulator 112 is controlled in a feedback manner, so that the fluid pressure applied to each frictionally coupling device of the transmission during its engaging action is regulated depending upon the currently required output of the engine 1 which is reflected by the THROTTLE pressure Pth, and the transient state of the frictionally coupling device which is reflected by the currently detected speed Nt of the input shaft 22A of the transmission, on which the computer 84 controls the duty cycle of the solenoid valve SD that governs the solenoid-controlled pressure Psl.

The feedback control of the back pressure Pac is effected until a shifting operation of the transmission is completed. The determination of the completion of a shifting operation is made based on the detected speed Nt of the input shaft 22A of the overdrive mechanism 40. If the input speed sensor 99 fails to operate, for example, the determination of the completion of the shifting operation cannot be made. To avoid this, the computer 84 has a timer T which is used to terminate the feedback control of the back pressure Pac, in the event of failure of the computer 84 to determine the completion of a shifting operation of the transmission based on the speed Nt.

Referring to the flow chart of FIG. 9, there will be described the manner in which the computer 84 effects normal determination of the completion or termination of a shifting operation of the transmission based on the detected speed Nt, and fail-safe determination of the completion based on a time t measured by the timer T.

In the control routine of FIG. 9, step S102 is initially executed to determine whether a FEEDBACK PRESSURE CONTROL flag F is set at "1", or not. The logical value "1" of this flag F indicates that the feedback control of the back pressure Pac is current in effect. The logical value "0" of the flag F indicates that the back pressure Pac is not currently controlled. Since the flag F is initially set at "1", step S102 is followed by step S104 in which the computer 84 determines whether the transmission should be shifted from one position to another with a shifting action of a frictionally coupling device, or not.

If the compute 84 determines that the transmission should be shifted, the control flow goes to step S106 in which the timer T is turned on to measure a time after the moment when the computer 84 determines a need of shifting of the transmission in step S104. Then, the control flow goes to step S110 to determine whether a shifting command to initiate the relevant shifting operation has been generated, or not. This determination may be accomplished by checking if the output of the solenoid valve Sl (S2) has been changed, or not.

It will be understood that a portion of the computer 84 assigned to execute step S104 functions as first determining means for determining that the transmission should be shifted, and that a portion of the computer 84 assigned to execute step S110 functions as means for producing a shifting command to initiate the shifting operation.

If the shifting command has not been generated yet, step S110 is followed by step S112 to hold the duty cycle of the solenoid valve SD at 0%. In this step S112, the flag F and the content t of the timer T are also reset. Therefore, the solenoid valve SD is held deenergized and the back pressure Pac of the accumulator 112 is not controlled while the transmission is not in the process of the shifting operation (after the shifting was found necessary in step S104).

If the shifting command has been generated, namely, if an affirmative decision (Y) is obtained in step S110, the control flow goes to step S114 wherein the computer 84 starts the feedback control of the back pressure Pac, as described above. Specifically, the duty cycle of the solenoid valve SD is adjusted to a suitable level Dset, which is changed from time to time based on the signals received by the computer 84. Further, the flag F is set to "1", to indicate that the feedback control of the back pressure Pac has been started. Then, the control flow goes to step S116 to determine whether the relevant shifting operation of the transmission is completed, or not. This determination is made by checking to see if the currently detected speed Nt of the input shaft 22A of the overdrive mechanism 40 is lowered down to a level (N0$\times i_H + \alpha$), where N0: speed of the output shaft 70 of the transmission, $i_H$: gear ratio of the transmission after the shifting is completed, $\alpha$: constant for minimizing an error in detecting the completion of the shifting operation.

If a negative decision (N) is obtained in step S116, namely, if the relevant shifting operation of the transmission is not completed, step S118 is executed to determine whether the time t measured by the timer T exceeds a predetermined time interval t0. If the measured time t is shorter than the predetermined value t0, the control flow returns to step S102. At this time, an affirmative decision (Y) is obtained in step S102 since the flag F has been set to "1" in step S114, whereby the control flow goes to step S114 to continue the feedback control of the back pressure Pac.

When the speed Nt has been lowered to or below the reference value (N0$\times i_H + \alpha$), an affirmative decision (Y) is obtained in step S116, and the control flow goes to step S112 in which the duty cycle D of the solenoid valve SD, the flag F and the timer T are reset to zero. As a result, the back pressure Pac of the accumulator 112 is rapidly raised as indicated in the graph of FIG. 10, whereby the fluid pressure applied to the frictionally coupling device (brake B2) is accordingly increased, so as to prevent a slipping action of the coupling device. Since the solenoid valve SD is deenergized, the life expectancy of the valve is improved.

It will be understood that a portion of the computer 84 assigned to execute step S116 functions as second determining means for determining the completion of a shifting operation of the transmission, based on the currently detected speed Nt of the turbine impeller 22 or input shaft 22A.

If the time t exceeds the predetermined value t0 without the determination of completion of the shifting operation, it is considered that the computer 84 has failed to detect the completion of the relevant shifting operation for some reason or other (e.g., due to failure of the input speed sensor 99), even though the shifting has been terminated in fact. In other words, the computer 84 determines that the relevant shifting operation is completed, when the time t exceeds the reference value t0, which is determined such that the shifting operation is normally completed during the time period t0.

Upon determination that the measured time t exceeds the predetermined reference value t0, the control flow goes to step S112 in which the duty cycle of the valve SD, flag F and timer T are all reset to zero, and the feedback control of the back pressure Pac is terminated, as described above.

It will be understood that a portion of the computer 84 assigned to execute step S118 functions as third determining means for determining the completion of a shifting operation of the transmission, based on the measured time t after the moment of the determination that the relevant shifting operation should be effected. Thus, the present control apparatus prevents the continuing energization and consequent deterioration of the solenoid valve SD in the event of failure of the input speed sensor 99, for example.

In addition, the use of the timer T provides the following advantages:

If a shifting operation of the transmission takes place while the fluid pressure applied to a frictionally coupling device is at an extraordinarily low level for some reason or other, it is impossible to adequately determine the completion of the shifting operation based on the detected speed Nt. Namely, an affirmative decision (Y) cannot be obtained in step S116 even after the piston 180 is moved its entire stroke by the line pressure PL received from the shift valve 114. In this case, the fluid pressure applied to the frictionally coupling device is suddenly raised up to the line pressure PL when the piston 180 has reached the stroke end. This causes a considerably large shifting shock of the transmission. According to the present control apparatus, however, the computer 84 determines that the shifting operation is completed, at the time when the measured time t exceeds the predetermined time interval t0. As a result, the back pressure Pac applied to the accumulator 112 is positively or forcibly increased, to accelerate the shifting operation. Therefore, even if the piston 180 of the accumulator 112 has reached the stroke end before the shifting operation has not been terminated, the shifting shock is reduced as compared with the case where the relatively low pressure is suddenly raised to the line pressure PL as produced by the shift valve 114. That is, the shifting shock is divided into two fractions, one occurring at the time when the back pressure Pac is positively increased upon affirmative decision in step S118, and other occurring at the time when the piston 180 has reached the stroke end.

Although it is necessary to electronically control the accumulator back pressure Pac, the feedback control of the back pressure Pac in an electronic manner is not essential.

While the timer T is adapted to measure the time t which has passed after the determination in step S104 that the transmission should be shifted, the time t measured by the timer T may be a time after the moment of generation in step S110 of a shifting command to commence the relevant shifting operation.

For easy inspection of the control apparatus, it is advisable to provide a warning indication that the measured time t has exceeded the predetermined value t0.

While the present invention has been described in its presently preferred embodiment with a certain degree of particularity, it is to be understood that the invention is not limited to the details of the illustrated embodiment, but may be embodied with various changes, alterations, modifications and improvements, which may occur to those skilled in the art, without departing from the spirit and scope of the invention defined in the following claims.

What is claimed is:

1. A hydraulic control apparatus for controlling a hydraulically operated automatic transmission of a motor vehicle having a frictionally coupling device, an accumulator which communicates with the frictionally coupling device, and a rotary member whose rotating speed changes due to a shifting action of the coupling device, said apparatus including an electronic control device for controlling a back pressure of said accumulator during a shifting action of the frictionally coupling device for minimizing a shifting shock of the transmission, said apparatus comprising:

first determining means for effecting a first determination that the transmission should be shifted with said shifting action of said frictionally coupling device;

means for generating a shifting command to initiate said shifting action after said first determination;

speed detecting means for detecting a rotating speed of said rotary member;

second determining means for effecting a second determination, based on the rotating speed detected by said speed detecting means, that said shifting action of said frictionally coupling device is completed;

time measuring means for measuring a time which has passed after one of a moment when said first determination is effected and a moment of generation of said shifting command; and third determining means for effecting a third determination that said shifting action is completed, irrespective of the detected rotating speed of said rotary member, when the time measured by said time measuring means exceeds a predetermined time interval.

2. A hydraulic control apparatus according to claim 1, wherein said automatic transmission comprises an underdrive mechanism including a plurality of planetary gear units capable of selectively establishing a plurality of shift positions, and an overdrive mechanism which is disposed between said underdrive mechanism and an engine of the vehicle.

3. A hydraulic control apparatus according to claim 1, wherein said rotary member comprises an input shaft of said overdrive mechanism, and said speed detecting means detects a rotating speed of said input shaft.

4. A hydraulic control apparatus according to claim 3, wherein said underdrive mechanism includes a hydraulically operated brake as said frictionally coupling device, said apparatus further comprising pressure control means for controlling a fluid pressure applied to said brake by regulating said back pressure of said accumulator, depending upon a change in the rotating speed of said input shaft of said overdrive mechanism detected by said speed detecting means.

5. A hydraulic control apparatus according to claim 4, further comprising means for terminating the regulation of said back pressure of said accumulator in response to said third determination by said third determining means.

6. A hydraulic control apparatus according to claim 4, wherein said pressure control means comprises calculating means for calculating a target speed based on speeds of said input shaft upon commencement and termination of the shifting action of said brake, said pressure control means controlling said back pressure of said accumulator so that the rotating speed of said input shaft of said overdrive mechanism detected by said speed detecting means coincides with said target speed calculated by said calculating means.

* * * * *